Dec. 25, 1951  W. C. DANIEL  2,579,553
HINGED JOINT AND SWIVEL BEAM FOR TRACTOR-MOUNTED IMPLEMENTS
Filed Sept. 9, 1949  2 SHEETS—SHEET 1

INVENTOR.
WILLIAM C. DANIEL,
BY
McMorrow, Berman + Davidson
ATTORNEYS.

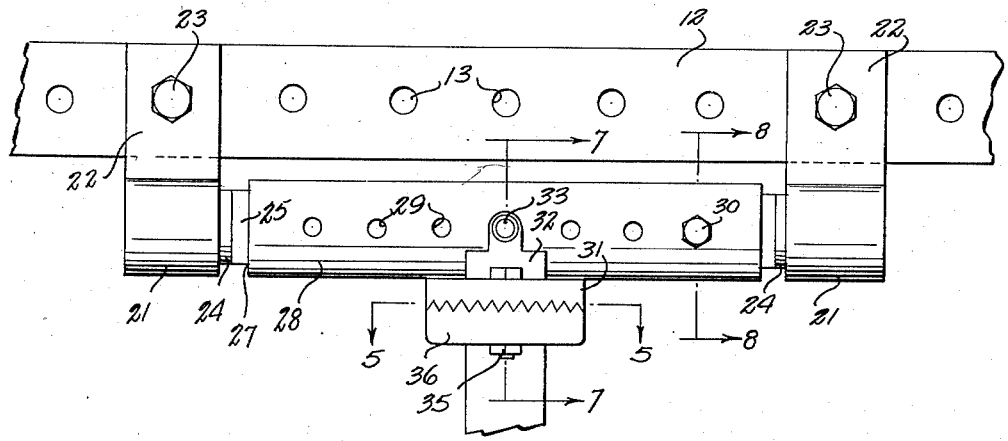
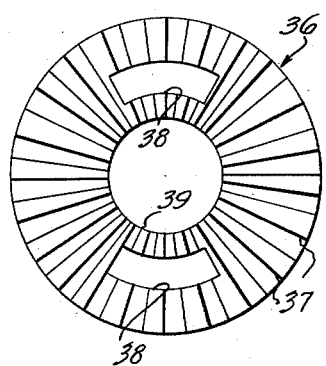
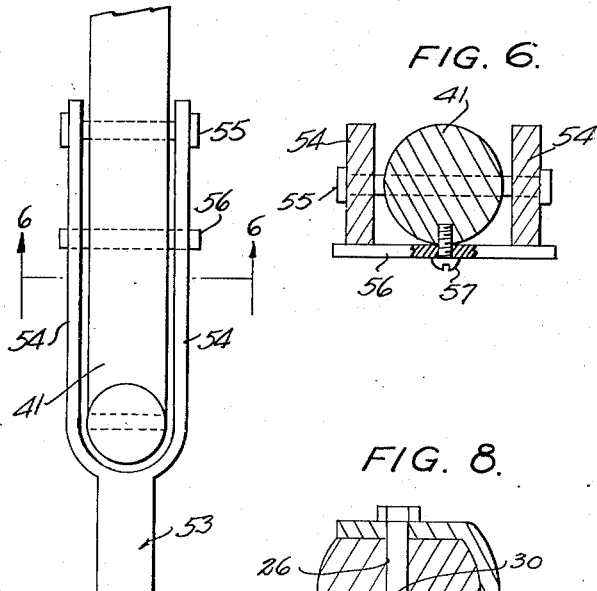
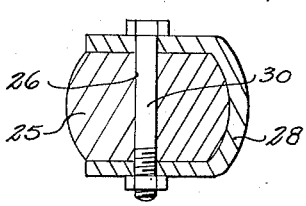
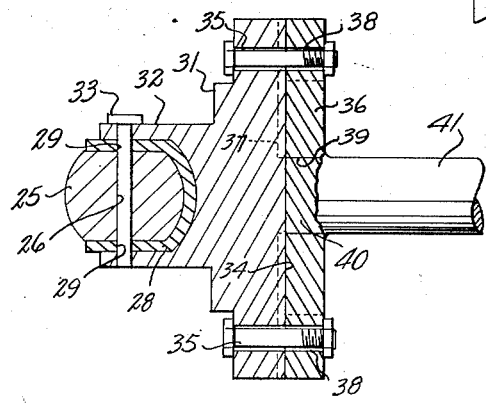

Patented Dec. 25, 1951

2,579,553

UNITED STATES PATENT OFFICE 2,579,553

HINGED JOINT AND SWIVEL BEAM FOR TRACTOR-MOUNTED IMPLEMENTS

William C. Daniel, Wilhelmina, Mo.

Application September 9, 1949, Serial No. 114,863

3 Claims. (Cl. 97—47)

This invention relates to improved hinged joint and swivel beam for tractor-mounted implements involving means for raising, lowering and adjusting the angular position of the implements, the primary object of the invention being to provide simplified and more efficient mechanism of this character, which is more easily installed in desired position on the tractor and is more easily and quickly connected and disconnected to different tractor-drawn implements.

Another important object of the invention is to provide mechanism of the above-indicated character which has simplified and more serviceable means of mounting on the tractor drawbar, which means can be easily and quickly adjusted toward either side of the tractor.

Other important objects and advantageous features of the invention will be apparent from the following description and the appended drawings, wherein, merely for purposes of illustration, a specific embodiment of the invention is set forth in detail.

In the drawings:

Figure 4 is an enlarged fragmentary top plan view of the connector mechanism;

Figure 5 is an enlarged front elevation of the rear locking disc, taken on the line 5—5 of Figure 4;

Figure 6 is a transverse vertical section taken on the line 6—6 of Figure 4;

Figure 7 is an enlarged vertical longitudinal section taken on the line 7—7 of Figure 4;

Figure 8 is a vertical longitudinal section taken on the line 8—8 of Figure 4.

Figure 1:
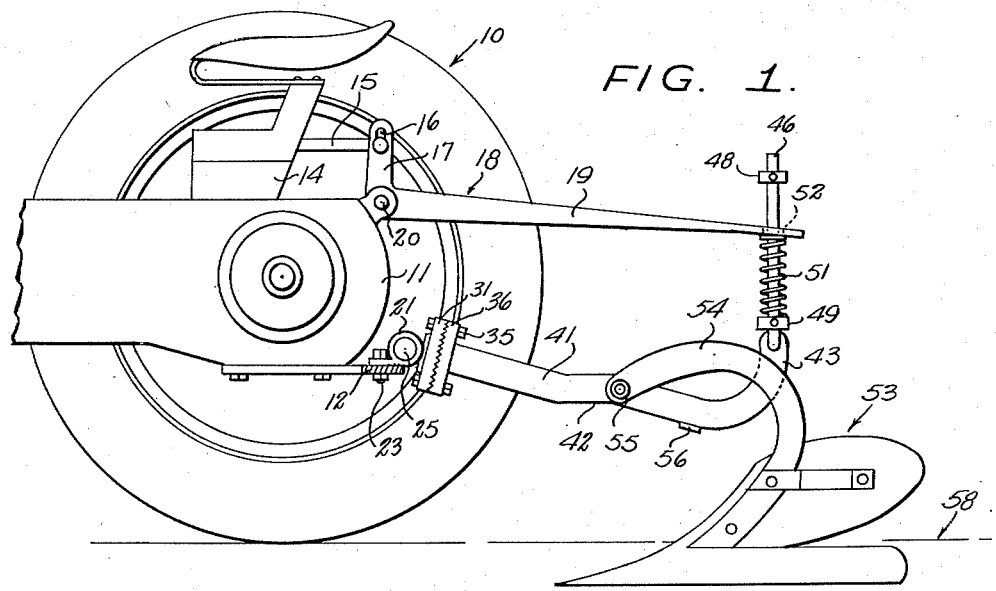
Figure 1 is a fragmentary left-hand elevation, partly in section, showing a plow in depressed plowing position and connected to the tractor in accordance with the present invention.

Referring in detail to the drawings, wherein like numerals designate like parts throughout the several views, the numeral 10 generally designates a conventional farm tractor having a rear axle housing 11 having on its under side a rearwardly-projecting, transversely-extending drawbar 12, provided between its ends with spaced bolt holes 13. A power lift 14 has a rearwardly-extending generally-horizontal rod 15 having a pin-and-slot connection 16 with the upper end of the short vertical arm 17 of a longitudinally disposed bell crank 18 having the long, rearwardly-extending arm 19, the bell crank 18 being pivoted on the upper part of the axle housing 11 for movement about a horizontal axis, as indicated at 20, whereby forward operation of the rod 15 elevates the long arm 19 and rearward operation of the rod 15 depresses the long arm 19. Conventional means (not shown) is contemplated for operating the power rod 15.

Two journal brackets 21, 21 have ears 22 arranged to rest upon the upper side of the tractor drawbar 12 and bolts 23 traverse these ears and selected ones of the holes 13. Turning in the brackets are the journals 24 on the opposite ends of a polygonal shaft 25 provided along its length with spaced bolt holes 26. The journals 24, 24 are reduced to define shoulders 27 on the shaft 25 to limit endwise movement of the shaft relative to the brackets 21, 21.

A longitudinally-elongated channel member 28, somewhat shorter than the shaft 25, embraces the rearward part of the shaft 25, as shown in Figure 8, and has longitudinally-spaced holes 29 in its flanges at least one of which accommodates a bolt 30 traversing the flanges and passing through a hole 26 in the shaft 25.

A fixed front locking disc 31 has a U-shape 32 on its forward side, as shown in Figure 7, embracing a selected point of the channel 28 and the shaft 25 enclosed thereby, and a vertical securing pin 33 traverses the arms of the U-shape 32 and aligned holes in the channel 28 and shaft 25, whereby the locking disc 31 is rigidly connected to swing in a vertical plane on the axis of the shaft 25. The rearward face of the locking disc 31 is provided with radial locking teeth 34 and two diametrically-opposite bolts 35, 35 extend rearwardly from the locking disc 31.

A rear locking disc 36 has radial locking teeth 37 on its forward side and two diametrically-opposite arcuate slots 38, 38 for the bolts 35, 35, whereby the discs 31 and 36 can be locked together with their teeth engaged, in several different angular positions of the rear disc 36 relative to the disc 31. The rear disc 36 has a center hole 39 to receive a stud 40 on the disc 31, whereby alignment of the discs is preserved.

Figure 2:
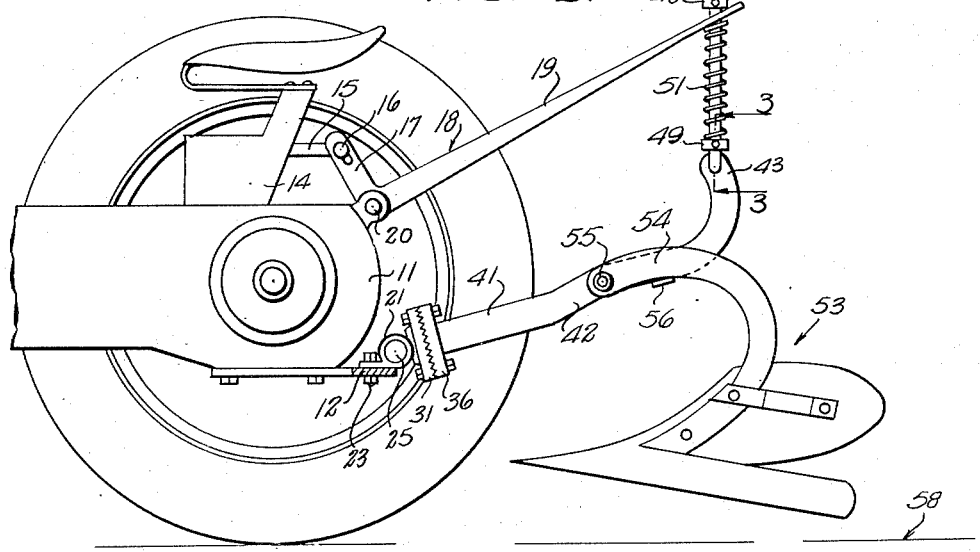
Figure 2 is a view similar to Figure 1, showing the plow in elevated inoperative carrying position.
Figure 3:
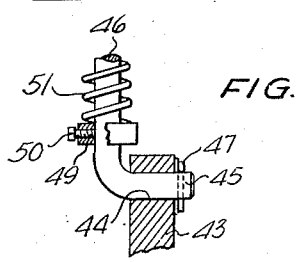
Figure 3 is an enlarged fragmentary transverse vertical section, taken on the line 3—3 of Figure 2.

A longitudinally disposed shaft 41 is arranged rearwardly of the drawbar 12 and has one end mounted on the drawbar for swinging movement about a horizontal axis. Specifically, the shaft 41 is integral with the rear locking disc 36. The intermediate part 42 of the shaft 41 is slightly upwardly offset, as indicated in Figures 1 and 2, and terminates in an upwardly-moved terminal 43 having a transverse hole 44 at its upper end.

Journaled in the hole 44 is a lateral pin 45 on the lower end of a vertical rod 46, a cotter pin 47 being used to hold the pin 45 in the hole 44. Vertically-spaced and vertically-adjustable stop collars 48 and 49, respectively, are on the rod 46 and have set screws 50 to hold them in selected positions on the rod 46. A helical spring 51 is circumposed on the rod 46 between the stop collars.

The rear end of the long arm 19 of the bell crank 18 has an opening 52 receiving the rod 46 between the upper end of the spring 51 and the upper stop collar 48.

A longitudinally disposed beam is positioned adjacent to the shaft 41 and has one end connected to the shaft 41 intermediate its ends for pivotal movement about an axis transverse of the shaft 41. Specifically, the beam is provided on one end with spaced longitudinal side members 54, 54 which embrace a portion of the shaft 41 intermediate its ends thereof, the side members 54, 54 being pivotally connected to the shaft 41 for movement about a transverse axis bolt 55 which extends through the side members 54, 54 and the adjacent portion of the shaft 41. The other end of the beam is adapted for securement of a plow element thereto. As shown in Figures 1 and 2, a plow 53 faces the drawbar 12 and is fixedly secured to the other end of the beam. A stop bar 56 secured across the under side of the shaft 41 by a screw 57, as indicated in Figure 6, extends beyond the sides of the shaft 41 to provide rests or stops for the plow beam side members 54, 54, whereby in the elevated position of the shaft 41, the plow 53 will be elevated above the ground 58 in an only slightly rearwardly-tilted position, as shown in Figure 2.

The plow 53 is moved to and held in the depressed plowing position shown in Figure 1 by operating the power rod 15 rearwardly. This depresses the long arm 19 of the bell crank 18, thereby permitting the plow 53 to subside into engagement with the ground 58. Further depression of the long arm 19 compresses the spring 51, whereby downward force or tension is exerted upon the plow 53 to bite into the ground 58 as the tractor is moved forwardly. The lateral tilt of the plow 53 is adjusted by adjusting the rear locking disc 36 relative to the front locking disc. The depth of penetration of the plow 53 is determined by the adjustment of the collars 48 and 49 on the rod 46.

I claim:

1. The combination with a tractor having a transverse drawbar, and a power lift having a forwardly and rearwardly-movable rod, of a transverse shaft mounted on said drawbar to turn on a transverse axis, a fixed shaft extending rearwardly from said transverse shaft, an implement having a beam extending forwardly along said fixed shaft, said beam having its forward end pivoted to an intermediate part of said fixed shaft, a stop on said fixed shaft engageable by said beam to limit downward tilting of the implement when said fixed shaft is elevated, a bell crank pivoted on said tractor having a short arm connected to said power rod and a rearwardly-extending long arm, and a spring-tensioned connection between the rear end of said long arm and the rear end of said fixed shaft whereby upon movement of said power rod in one direction said long arm will be elevated and effect elevation of said fixed shaft and said implement and movement of said power rod in the opposite direction will depress said long arm and permit said fixed shaft and said implement to subside to depressed position.

2. Mechanism for operatively supporting an implement having a beam on a tractor having a transverse drawbar and an upwardly and downwardly-swingable power-actuated arm, said mechanism comprising a journal bracket adapted to be fixed on said drawbar, a fixed shaft having a journal on its forward end supportably engaging said journal bracket, said fixed shaft extending rearwardly from said drawbar and having a terminal in its rear end, a vertical lift rod secured at its lower end to said terminal with its upper end arranged for slidable connection with the rear end of said power-actuated arm, an upper stop on said lift rod adapted to be positioned above and for engagement by said power-actuated arm upon upward swinging of said power-actuated arm, a lower stop on said lift rod, a helical spring circumposed on said lift rod above and engaging said lower stop, said spring being adapted to be positioned beneath and to engage the under side of said power-actuated arm and be compressed thereby as said power-actuated arm is swung downwardly and whereby downward spring tension is imposed upon said fixed shaft tending to depress said fixed shaft relative to said power actuated arm, and an implement having a forwardly-projecting beam pivoted at its forward end to an intermediate part of said fixed shaft, means connecting the fixed shaft journal to said journal bracket to adjust the lateral tilt of said implement comprising two axially-aligned toothed locking discs, and means separably connecting said discs whereby said discs can be separated from locking relation to permit rotation of one of said discs relative to the other and thereafter rearranged in locked relation.

3. Mechanism for operatively supporting an implement having a beam on a tractor having a transverse drawbar and an upwardly and downwardly-swingable power-actuated arm, said mechanism comprising a journal bracket adapted to be fixed on said drawbar, a fixed shaft having a journal on its forward end supportably engaging said journal bracket, said fixed shaft extending rearwardly from said drawbar and having a terminal in its rear end, a vertical lift rod secured at its lower end to said terminal with its upper end arranged for slidable connection with the rear end of said power-actuated arm, an upper stop on said lift rod adapted to be positioned above and for engagement by said power-actuated arm upon upward swinging of said power-actuated arm, a lower stop on said lift rod, a helical spring circumposed on said lift rod above and engaging said lower stop, said spring being adapted to be positioned beneath and to engage the under side of said power-actuated arm and be compressed thereby as said power-actuated arm is swung downwardly and whereby downward spring tension is imposed upon said fixed shaft tending to depress said fixed shaft relative to said power-actuated arm, and an implement having a forwardly-projecting beam pivoted at its forward end to an intermediate part of said fixed shaft, and stop means on said fixed shaft rearwardly of the pivotal connection of the implement beam thereto and beneath said beam for engaging the beam and limiting downward pivoting of the implement relative to said fixed shaft when said fixed shaft is elevated to a predetermined elevation.

WILLIAM C. DANIEL.

REFERENCES CITED

The following references are of record in the file of this patent:

UNITED STATES PATENTS

| Number | Name | Date |
|---|---|---|
| 2,225,253 | Beyer | Dec. 17, 1940 |
| 2,358,281 | Ray | Sept. 12, 1944 |
| 2,487,955 | Todd | Nov. 15, 1949 |